ated application and graduated release of the

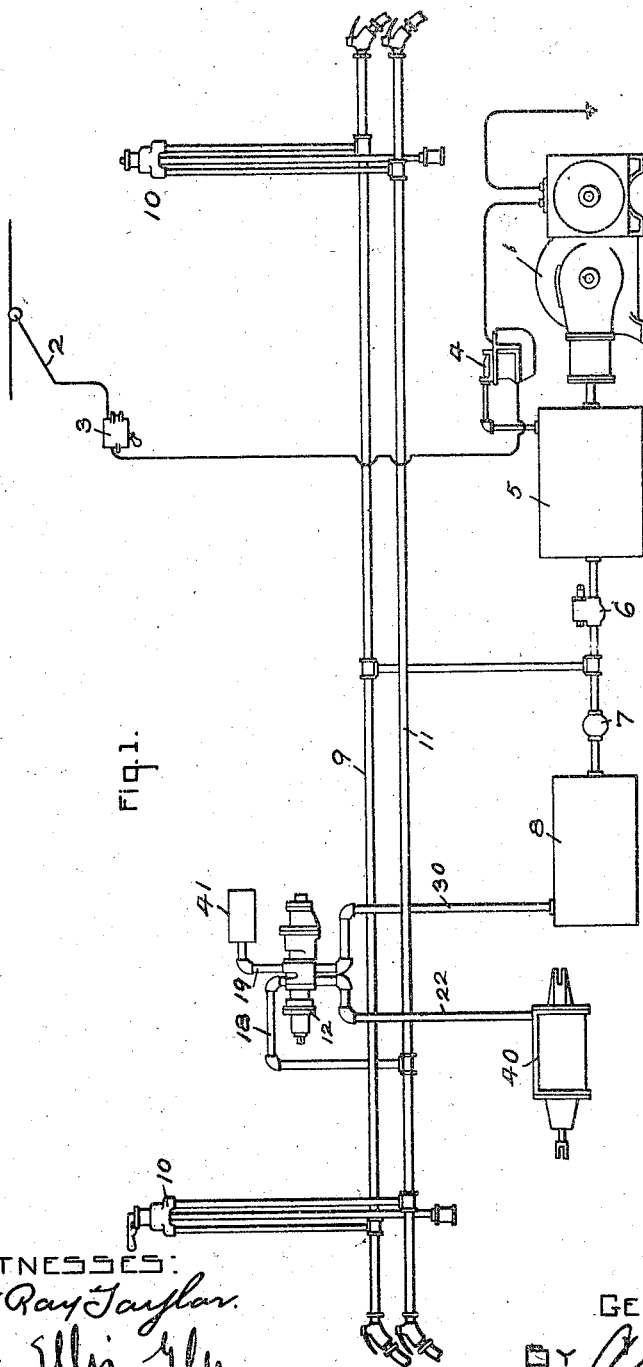

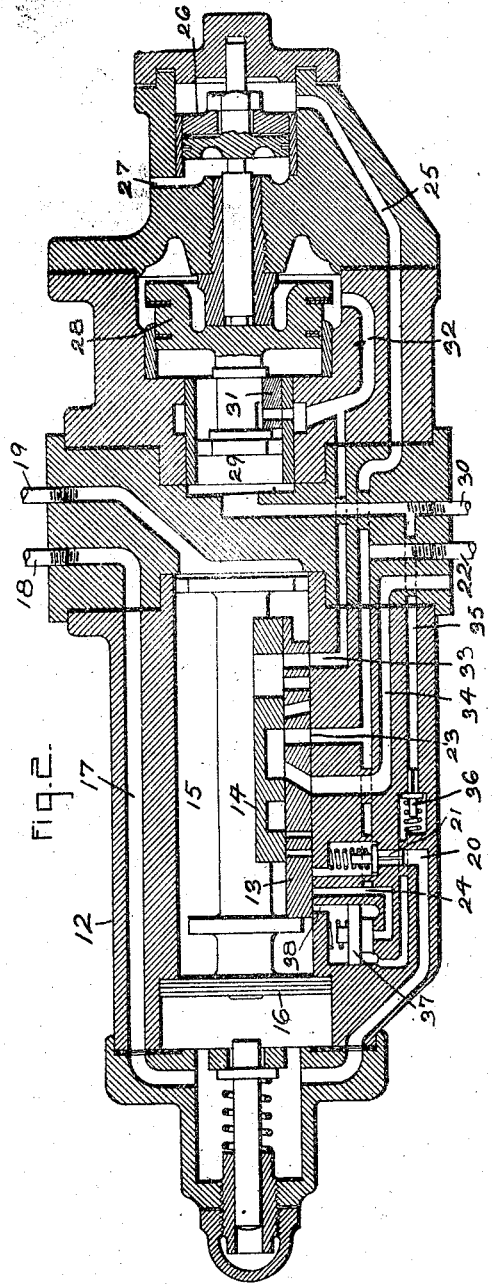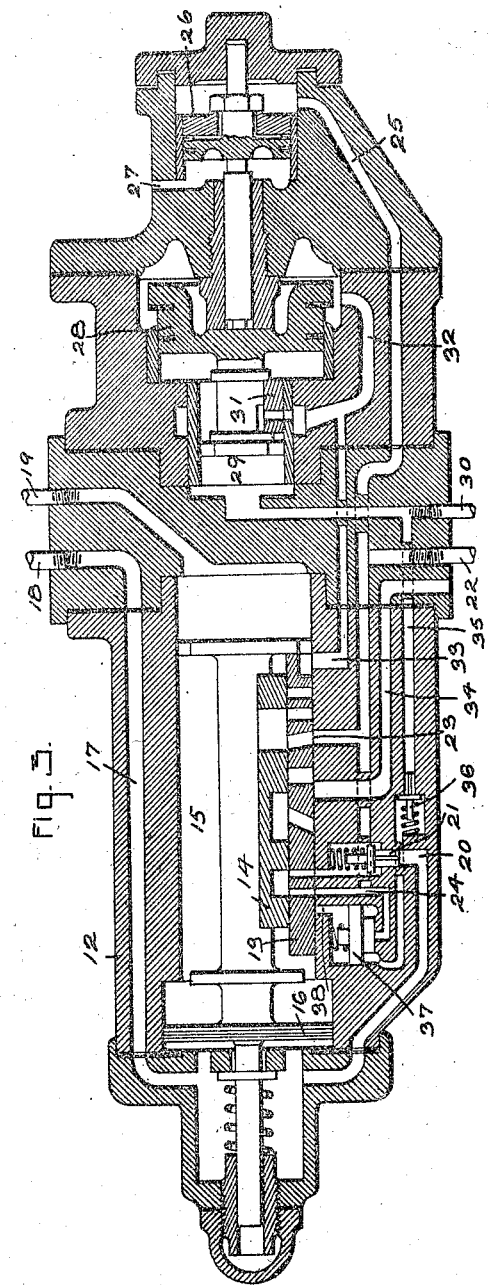

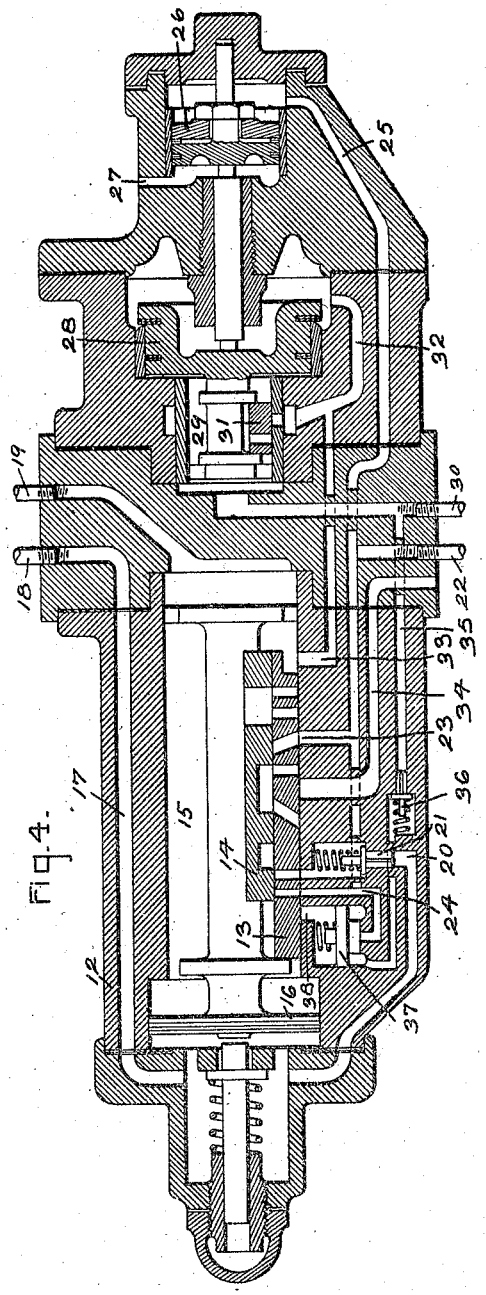
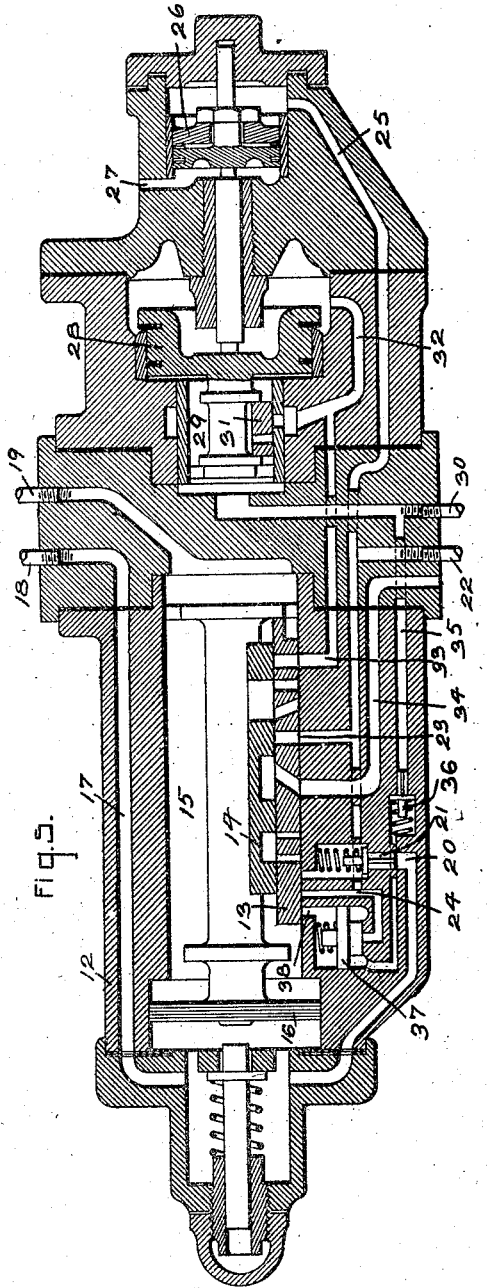

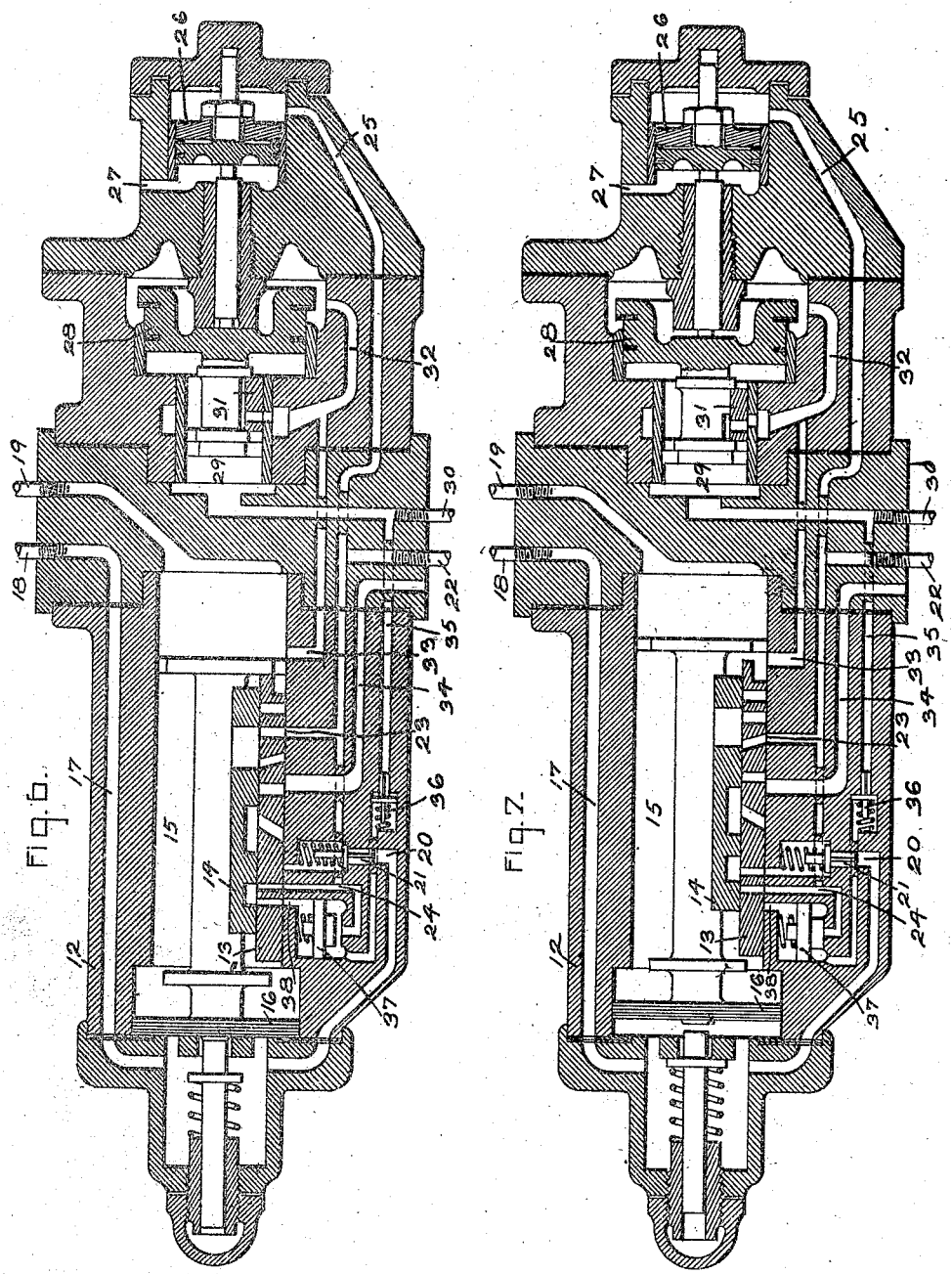

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AUTOMATIC AIR-BRAKE SYSTEM.

No. 919,609.  Specification of Letters Patent.  Patented April 27, 1909.

Application filed August 14, 1908. Serial No. 448,489.

*To all whom it may concern:*

Be it known that I, GEORGE MACLOSKIE, a citizen of the United States, residing at Schenectady, county of Schenectady, State of New York, have invented certain new and useful Improvements in Automatic Air-Brake Systems, of which the following is a specification.

My invention relates to automatic air-brake systems, and consists of improvements in the system disclosed in my earlier application, Serial No. 390,063, filed August 24, 1907.

In that earlier application I described an automatic air-brake system in which a graduated application and graduated release of the brakes are obtained, the system being so designed that the pressures in all the brake cylinders are equal, notwithstanding differences in travel of the different brake cylinder pistons. The system described comprises a main valve having ports for controlling the supply of air to, and the release of air from the brake cylinder, a piston for operating said valve, the piston chamber being in communication with the valve chamber on one side of the piston and with the train pipe on the other, a reservoir carrying air at substantially constant pressure, a controlling valve controlling the supply of air from said reservoir to the valve chamber of the main valve, and means for operating said controlling valve controlled in accordance with variations in the brake cylinder pressure. By means of this arrangement a predetermined lowering and raising of the train pipe pressure results in a proportionate increase or decrease of brake cylinder pressure and when that proportionate increase or decrease has occurred the controlling valve is closed or opened as the case may be and the main valve is immediately returned to lap position.

One feature of my present invention consists in so arranging the connections from reservoir to main valve established by the controlling valve, that when the controlling valve opens, it connects the reservoir to a port in the main valve, instead of directly to the valve chamber of the main valve. This port is normally open to the valve chamber, but is closed when the main valve moves from release to lap position in graduating the release of the brakes. The object of thus disconnecting the controlling valve from the valve chamber is to give a more positive action to the valve mechanism, as will be best understood when the operation is described in connection with the drawings.

Another feature of my invention consists in arranging the valve mechanism to give a quicker service application of the brakes, by providing the main valve with a full service position and a partial service position, in the former of which the brake cylinder is connected both to reservoir through the controlling valve and to train pipe, so as to accelerate the decrease in train pipe pressure, and in the latter of which brake cylinder is connected to reservoir only. The purpose of providing this latter service position of the main valve is to avoid the result that would otherwise be produced by a leaky brake cylinder. If a brake cylinder leaks, the reduction of pressure in the brake cylinder will cause the controlling valve to act to supply air from reservoir to the main valve, and to move the main valve into service position. If, in this service position, to which the main valve is moved by brake cylinder leakage, the train pipe were connected to brake cylinder, the result would be to lower the train pipe pressure, and consequently to apply the brakes harder on all the train. By providing two service positions, this result is avoided, while at the same time, the advantage of a quick service application is obtained.

I further provide an emergency application position of the main valve, in which a connection is opened from reservoir to brake cylinder independently of the controlling valve.

My invention will best be understood by reference to the accompanying drawings, in which—

Figure 1 shows diagrammatically an automatic air-brake system arranged in accordance with my invention, while Figs. 2 to 7, inclusive, show cross-sectional views of the valve mechanism in release, full service, service lap, release lap, emergency, and partial service positions, respectively.

Referring first to Fig. 1, 1 represents a motor-driven air compressor, the motor of which is supplied with current through the trolley or other current collecting means 2, the switch 3, and pressure governor 4. The air compressor supplies the main reservoir 5, which is connected through a pressure reducing valve 6, and a check valve 7, to a service reservoir 8, the air in which remains at substantially constant pressure. The main reservoir 5 is also connected through pressure reducing valve 6 to the reservoir line, or as it is sometimes called, the control pipe, 9. 10, 10 represent motorman's valves which are connected both to reservoir line 9 and train pipe 11, and arranged to connect the train pipe to atmosphere or to reservoir line to apply or to release the brakes. 12 represents the automatic valve mechanism which controls the supply of air to, and the release of air from, the brake cylinder 40.

41 represents a small pressure reservoir connected with the valve chamber of the valve 12.

Now, referring to Fig. 2, which shows the automatic valve mechanism 12 in cross-section, with the parts in release position, 13 represents a slide valve and 14 a graduating valve in the main valve chamber 15. The slide valve 13 and graduating valve 14 are actuated by the piston 16, the piston chamber being open on the right-hand side to the valve chamber 15, and on the left-hand side in connection through the passage 17 with pipe 18 leading to the train pipe. 19 is a pipe leading to the small pressure reservoir 41 (see Fig. 1), which is thus in constant communication with the valve chamber 15. The train pipe is also in communication through pipe 18 and passage 17 with a passage 20, in which is a check valve 21, and which opens through the check valve to a port in the valve seat of the main valve. 22 represents a pipe leading to brake cylinder. This pipe is in communication with ports 23 and 24 in the valve seat of the main valve, and is also connected through a passage 25 with a chamber on the right-hand side of piston 26; the left-hand side of which piston is connected to atmosphere through a port 27. On the spindle of this piston is a second piston 28. The left-hand side of piston 28 is in communication with the valve chamber 29, which is connected through pipe 30 to service reservoir 8 (see Fig. 1). In the valve chamber 29 is a valve 31 actuated by the pistons 26 and 28 jointly. This valve 31 has a port, which, in release position, as shown in Fig. 2, connects the valve chamber 29 through the passage 32 with right-hand side of piston 28, and also to port 33 in the main valve seat, which port is normally open to the valve chamber 15. Thus, with the valve mechanism in release position, the pressures on both sides of piston 16, and on both sides of piston 28 are equal; the pressures in both pressure reservoir 41 and service reservoir 8 being the same as train-pipe pressure. Passage 34 leads from a port in the main valve seat to atmosphere. Passage 35 leads from pipe 30, connected to the service reservoir, through a pressure reducing valve 36 to the lower side of a small piston-operated valve 37. The upper side of this check valve opens into a port 38 in the valve seat.

For a service application of the brakes, the train-pipe pressure is reduced a suitable amount, causing piston 16 to move to the left, bringing slide valve 13 and graduating valve 14 into the positions shown in Fig. 3. By this movement of the valves, the port 23 in communication with brake cylinder is disconnected from passage 34, which leads to atmosphere, and is connected to the valve chamber 15. This valve chamber is now in communication with both the pressure reservoir 41 through pipe 19, and with the service reservoir 8 through port 33, valve 31, valve chamber 29 and pipe 30. A connection is also established from train-pipe 18, through passages 17 and 20, check valve 21, port 24 and pipe 22, to brake cylinder. Brake cylinder is thus connected both to train-pipe and to the pressure and service reservoirs. By the flow of air to brake cylinder, the pressures in valve chamber 15 and pressure reservoir 41, and consequently the pressure on the right-hand side of piston 28 are reduced, while the flow of air from train pipe to brake cylinder accelerates the fall of train-pipe pressure, and assists in producing a quick application of the brakes. The valves remain in the position shown in Fig. 3 until the brake cylinder pressure rises to an amount determined by the amount that train-pipe pressure has been reduced. This brake cylinder pressure is impressed on the right-hand side of piston 26, and when it reaches a predetermined amount, forces this piston, and consequently the valve 31, to the left, as shown in Fig. 4, breaking the connection from service reservoir 8 to valve chamber 15. The further flow of a small amount of air from chamber 15 to brake cylinder, reduces the pressure in chamber 15 sufficiently to cause piston 16 to move back toward the right to the position shown in Fig. 4, moving the graduating valve 14 so as to close the ports 23 and 24 leading to brake cylinder. The valve is thus lapped, and the pressure in the brake cylinder is maintained. A further decrease of the train pipe pressure results in a repetition of the operation above described, and an increase in brake cylinder pressure. Since the movement of the main valve to lap position is determined by the rise in brake cylinder pressure, it will be seen that the same pressure will be obtained in all the brake cylinders, regardless of the travel of the several brake cylinder pistons. It will further be seen that the amount of variation in brake cylinder pressure for a given variation in train pipe pressure depends on the relative sizes of pistons 26 and 28. By making piston 26 smaller, as shown, the brake cylinder pressure must rise a greater amount than the train pipe pressure is decreased, in order to restore the balance of pressures on the pistons.

If a partial release of the brakes is desired, the pressure in the train-pipe is raised a suitable amount, so as to return piston 16 and valves 13 and 14 to the positions shown in Fig. 2. The port 23, in communication with the brake cylinder, is thereby connected through passage 34 to atmosphere and the pressure in the brake cylinder reduced. When this pressure has fallen a certain amount, reducing the pressure on the right-hand side of piston 26, the service reservoir pressure in valve chamber 29, overcoming the sum of the pressures exerted on pistons 28 and 26 respectively by the air pressures in valve chamber 15 and in brake cylinder, moves pistons 26 and 28, and valve 31 to the right to the positions shown in Fig. 2, again connecting service reservoir to valve chamber 15. When the pressure in valve chamber 15 is raised sufficiently, piston 16 is moved back toward the left into the position shown in Fig. 5, moving the graduating valve 14 so as to close the port 23 connected to brake cylinder, and also to close the port 33 connected to the right-hand piston 28. The closing of the first port stops the exhaust from brake cylinder, while the closing of the second port causes the pressure on the right-hand side of piston 28 to rise rapidly, forcing the piston 28 back toward the left, as shown in Fig. 5, so as to disconnect service reservoir from main valve. A further increase of train-pipe pressure results in a repetition of the operations above described, and a further reduction of brake-cylinder pressure.

For an emergency application, the train-pipe pressure is reduced a greater amount than for service application, so that piston 16 is moved to its extreme left-hand position, as shown in Fig. 6, thereby establishing a connection from brake cylinder to service reservoir; as in the service application position of Fig. 3, and also connecting port 24, which is in communication with brake cylinder, to port 38, which is in communication with the upper side of the small piston-operated valve 37. The pressure on the upper side of this check valve is thus reduced, causing the check valve to open and establishing a direct connection, independent of the controlling valve, from service reservoir through pipe 30, passage 35, pressure-reducing valve 36, and check valve 37 to brake cylinder. The valve 36 serves to limit the brake cylinder pressure in emergency application, in order that the brakes may be released after application, which could not be done if the full reservoir pressure were admitted to brake cylinder and consequently to piston 26.

If, while the brakes are applied, the valve mechanism being in the lap position shown in Fig. 4, air leaks from the brake cylinder, so as to reduce the pressure on the right-hand side of piston 26, valve 31 is moved to the right, as shown in Fig. 7, connecting service reservoir to valve chamber 15. This causes piston 16 to move a short distance toward the left, shifting the graduating valve 14, so as to establish connection from service reservoir through port 33 and port 23 to brake cylinder, so as to increase the brake cylinder pressure and compensate for leakage. The graduating valve is not moved far enough, however, to open port 24, so that no air is taken from train-pipe to brake cylinder. Thus, by providing the partial service position of Fig. 7, in addition to the full service position of Fig. 3, leakage of air from the brake cylinder is prevented from lowering the train-pipe pressure, while at the same time for ordinary service application, the train-pipe is exhausted into brake cylinder, so as to accelerate the application of the brakes.

I do not desire to limit myself to the particular construction and arrangement of parts here shown, but aim in the appended claims to cover all modifications which are within the scope of my invention.

What I claim as new and desire to secure by Letters Patent of the United States, is,—

1. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for connecting said reservoir to and disconnecting it from a port of said main valve, said port being normally open to said valve chamber but arranged to be closed by said main valve in one position thereof, and means responsive to variations of pressure in the brake cylinder for controlling the operation of said controlling valve.

2. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train pipe on the other, a reservoir containing air under substantially constant pressure, a controlling valve for connecting said reservoir to and disconnecting it from a port of said main valve, said port being normally open to said valve chamber but arranged to be closed by said main valve in moving from release to lap position, and means responsive to variations in brake cylinder pressure for controlling the operation of said controlling valve.

3. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, and a controlling valve for connecting said reservoir to and disconnecting it from a port of said main valve, said port being normally open to said valve chamber but arranged to be closed by said main valve in one position thereof, the controlling valve being provided with a piston connected on one side to its own valve chamber and on the other side to the valve chamber of the main valve and a second piston connected on one side to brake cylinder and on the other side to atmosphere.

4. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for connecting said reservoir to and disconnecting it from a port of said main valve, said port being normally open to said valve chamber but arranged to be closed by said main valve in one position thereof, and operating means for said controlling valve subjected to a substantially constant pressure opposed to the sum of brake cylinder pressure and a pressure corresponding to the pressure in the valve chamber of the main valve.

5. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a small pressure reservoir in constant communication with the valve chamber, a service reservoir containing air under substantially constant pressure, a controlling valve for connecting said service reservoir to and disconnecting it from a port of the main valve, said port being normally open to said valve chamber both in release and in application of the brakes but arranged to be closed by said main valve in one position thereof, and means responsive to variations of brake cylinder pressure for controlling the operation of said controlling valve.

6. An automatic air brake system, comprising a brake cylinder, a train-pipe, a main valve for controlling the supply of air for operating said valve, the piston chamber being in communication with the valve chamber on one side of the piston and with the train-pipe on the other, a reservoir containing air under substantially constant pressure, a controlling valve for establishing and breaking a connection from said reservoir to the main valve, the main valve being arranged in a full service position to connect brake cylinder to both said reservoir connection and to train-pipe and in a partial service position to connect brake cylinder to said reservoir connection only, and means responsive to variations of brake cylinder pressure for controlling the operation of said controlling valve.

7. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train pipe on the other, a reservoir containing air under substantially constant pressure, a controlling valve for establishing and breaking a connection from said reservoir to the main valve, the main valve being arranged in a full service position to connect brake cylinder to both said reservoir connection and to train-pipe and in a partial position to connect brake cylinder to said reservoir connections only, a check valve inserted in the connection through the main valve from train-pipe to brake cylinder, and means controlled by brake cylinder pressure for controlling the operation of the controlling valve.

8. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for connecting said reservoir to and disconnecting it from a port of said main valve, said port being normally open to said valve chamber but arranged to be closed by said main valve in one position thereof, said main valve being arranged in a full service position to connect both its valve chamber and train-pipe to brake cylinder and in partial service position its valve chamber only, and means responsive to variations in brake cylinder pressure for controlling the operation of the controlling valve.

9. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for connecting said reservoir to and disconnecting it from a port of the main valve, said port being open to said valve chamber both in application and release positions of the main valve, and the main valve having two lap positions, to which it moves from application and from release positions respectively, in the first of which lap positions said port is open and in the second closed, and means responsive to variations of brake cylinder pressure for controlling the operation of the controlling valve.

10. An automatic air brake system, comprising a brake cylinder, a train-pipe a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for establishing and breaking a connection from said reservoir to the main valve, the main valve being arranged in an emergency position to establish a connection from said reservoir to brake cylinder independent of the controlling valve, and means responsive to variations of brake cylinder pressure for controlling the operation of the controlling valve.

11. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for establishing and breaking a connection from said reservoir to the main valve, the main valve being arranged in an emergency position to establish a connection from said reservoir to brake cylinder independent of the controlling valve, a pressure-reducing valve in said independent connection, and means responsive to brake cylinder pressure for controlling the operation of the controlling valve.

12. An automatic air brake system, comprising a brake cylinder, a train-pipe, a main valve for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for connecting said reservoir to and disconnecting it from a port of said main valve, said port being normally open to said valve chamber but arranged to be closed by said main valve in one position thereof, said main valve being arranged in an emergency position to establish a connection from said reservoir to brake cylinder independent of the controlling valve, and means responsive to variations of brake cylinder pressure for controlling the operation of the controlling valve.

In witness whereof, I have hereunto set my hand this 7th day of August, 1908.

GEORGE MACLOSKIE.

Witnesses:
HELEN ORFORD,
BENJAMIN B. HULL.